(12) United States Patent
Ng et al.

(10) Patent No.: US 9,585,211 B2
(45) Date of Patent: Feb. 28, 2017

(54) FLASH-LED DRIVER DISCHARGE CONTROL

(71) Applicant: SKYWORKS SOLUTIONS, INC., Woburn, MA (US)

(72) Inventors: Wendy Ng, Los Gatos, CA (US); George A. Hariman, Sunnyvale, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 197 days.

(21) Appl. No.: 14/482,284

(22) Filed: Sep. 10, 2014

(65) Prior Publication Data

US 2015/0077014 A1 Mar. 19, 2015

Related U.S. Application Data

(60) Provisional application No. 61/879,114, filed on Sep. 17, 2013.

(51) Int. Cl.
*H05B 37/02* (2006.01)
*H05B 33/08* (2006.01)
*H02M 3/07* (2006.01)
*H02M 3/156* (2006.01)
*H02J 7/34* (2006.01)

(52) U.S. Cl.
CPC .......... *H05B 33/0818* (2013.01); *H02M 3/07* (2013.01); *H02M 3/156* (2013.01); *H02J 7/345* (2013.01); *H05B 33/0815* (2013.01); *H05B 33/0821* (2013.01); *H05B 33/0896* (2013.01)

(58) Field of Classification Search
CPC ............ H05B 33/0815; H05B 33/0827; H05B 33/0821; H05B 33/0896; G03B 15/05; G03B 2215/0567; Y02B 20/346; H02J 7/345; H02J 7/00; H02M 3/156; H02M 3/1582
USPC ........ 315/291, 227 R, 307, 297, 308, 200 A, 315/241 P; 320/167, 166
See application file for complete search history.

(56) References Cited

U.S. PATENT DOCUMENTS

| 6,087,863 | A  | * | 7/2000 | Aflatouni | ............... | H05B 33/08 327/111 |
| 7,973,487 | B2 | * | 7/2011 | Vaucourt  | ............... | G03B 15/05 315/224 |

(Continued)

*Primary Examiner* — Thai Pham
*Assistant Examiner* — Borna Alaeddini
(74) *Attorney, Agent, or Firm* — Chang & Hale, LLP

(57) ABSTRACT

Various implementations include circuits, devices and/or methods that enable the repeated generation of controlled surges with lower risk of component failure. Some implementations include a discharge control assembly including a discharge circuit and a controller. In some implementations, the discharge circuit is selectively connectable to a driver circuit, and the discharge circuit is configured to provide a dominant discharge path for the driver circuit when the driver circuit is effectively decoupled from a first load in order to decay an electrical condition of the driver circuit produced prior to the driver circuit being effectively decoupled from the first load. In some implementations, the controller is configured to selectively connect the driver circuit to a combination of the discharge circuit and the first load, and in at least one combination the discharge circuit is effectively coupled to the driver circuit when the first load is effectively decoupled from the driver circuit.

20 Claims, 11 Drawing Sheets

(56) References Cited

U.S. PATENT DOCUMENTS

| | | | | |
|---|---|---|---|---|
| 8,493,036 B2* | 7/2013 | Ferrario | ............... | G03B 15/05 |
| | | | | 320/166 |
| 8,981,653 B2* | 3/2015 | Trattler | ............... | G03B 15/05 |
| | | | | 315/200 A |
| 9,351,361 B2* | 5/2016 | Teufel | ............... | H02M 3/158 |
| 2008/0129219 A1* | 6/2008 | Smith | ............... | H02M 3/1584 |
| | | | | 315/291 |
| 2009/0174345 A1* | 7/2009 | Vaucourt | ............... | G03B 15/05 |
| | | | | 315/294 |
| 2010/0072902 A1* | 3/2010 | Wendt | ............... | H05B 33/0818 |
| | | | | 315/161 |
| 2011/0080156 A1* | 4/2011 | Briere | ............... | H02M 1/32 |
| | | | | 323/351 |
| 2012/0104962 A1* | 5/2012 | Chen | ............... | H05B 33/0827 |
| | | | | 315/228 |
| 2012/0188293 A1* | 7/2012 | Furukawa | ............... | G09G 3/342 |
| | | | | 345/690 |
| 2012/0235601 A1* | 9/2012 | Teggatz | ............... | H05B 33/0818 |
| | | | | 315/312 |
| 2012/0268029 A1* | 10/2012 | Trattler | ............... | H05B 33/0815 |
| | | | | 315/240 |
| 2013/0313996 A1* | 11/2013 | Williams | ............... | H02M 3/158 |
| | | | | 315/291 |

* cited by examiner

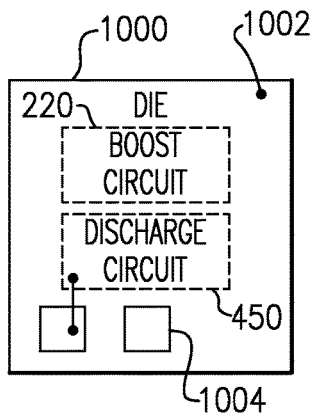
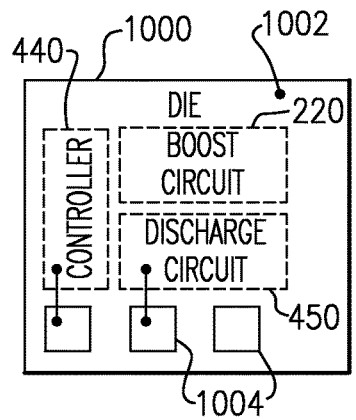
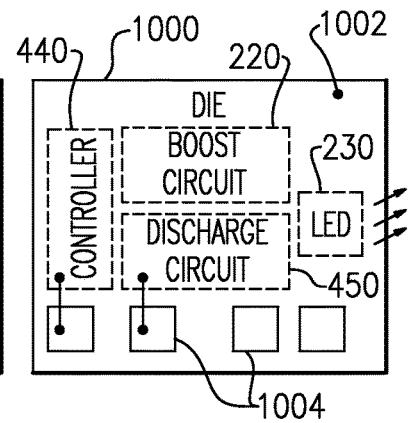
FIG.10A  FIG.10B  FIG.10C
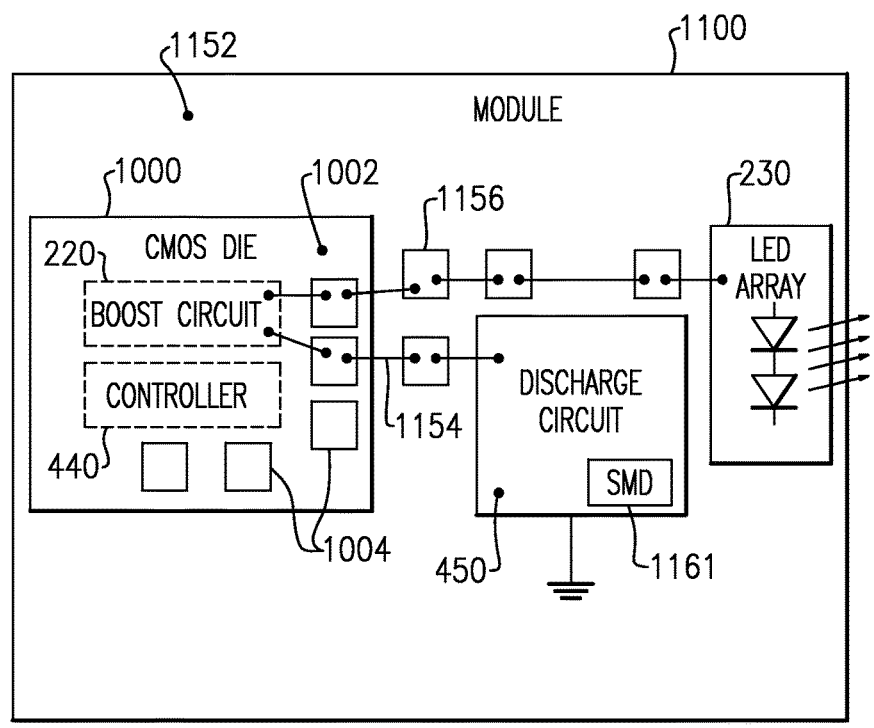
FIG.11

FLASH-LED DRIVER DISCHARGE CONTROL

RELATED APPLICATIONS

This application claims the benefit of U.S. Provisional Patent Application No. 61/879,114, filed on Sep. 17, 2013, and which is incorporated by reference herein.

TECHNICAL FIELD

The present disclosure relates to electronic circuits, and in particular, to circuits enabled to repeatedly produce controlled surges with lower risk of component failure.

BACKGROUND

The ongoing demand for the development of consumer electronics is often met by incorporating additional features into existing products. For example, an increasing number of electronic devices, such as smartphones and tablet computers, include a digital camera that adds to and/or enhances the primary functions of the electronic devices. Digital cameras are a particularly heavily used feature of current smartphones, which is supported by the significant portion of all new photos that are taken with smartphones.

A drawback of incorporating additional components and/or features into existing devices is that there is a cumulative risk of a component failure that will leave the entire device unusable or significantly less desirable from an end user perspective. Continuing the example above, a smartphone as a whole may be less useful to the end user if the digital camera integrated into the smartphone stops working as expected.

Component failure is particularly troubling when a component failure damages an electronic device as a whole. For example, a camera flash associated with a digital camera relies on an electrical surge to produce a flash of light. A suitable electrical surge is typically produced by a boost circuit included in a camera flash module that is ultimately integrated into a smartphone. Given the relatively high operational power levels, the boost circuit can damage a smartphone as a whole by sinking excessive current and/or causing a voltage spike. Even if a single current sink and/or voltage spike does not cause a failure, repeated operation of a boost circuit may eventually lead to failure as components deteriorate after repeated cycles of electrical surges and the undesired aftereffects.

SUMMARY

Various implementations of circuits, methods and devices within the scope of the appended claims each have several aspects, no single one of which is solely responsible for the attributes described herein. Without limiting the scope of the appended claims, some prominent features are described. After considering this disclosure, and particularly after considering the section entitled "Detailed Description," one will understand how the aspects of various implementations enable the repeated generation of controlled surges with lower risk of component failure.

Some implementations include a discharge control assembly including a discharge circuit and a controller. In some implementations, the discharge circuit is selectively connectable to a driver circuit, and the discharge circuit is configured to provide a dominant discharge path for the driver circuit when the driver circuit is effectively decoupled from a first load in order to decay an electrical condition of the driver circuit produced prior to the driver circuit being effectively decoupled from the first load. In some implementations, the controller is configured to selectively connect the driver circuit to a combination of the discharge circuit and the first load, and in at least one combination the discharge circuit is effectively coupled to the driver circuit when the first load is effectively decoupled from the driver circuit.

Some implementations include a discharge control assembly module including a packaging substrate, a discharge circuit and a controller. In some implementations, the packaging substrate is configured to receive a plurality of components. In some implementations, the discharge circuit is included on at least a portion of the packaging substrate, and is selectively connectable to a driver circuit, and the discharge circuit is configured to provide a dominant discharge path for the driver circuit when the driver circuit is effectively decoupled from a first load in order to decay an electrical condition of the driver circuit produced prior to the driver circuit being effectively decoupled from the first load. In some implementations, the controller is configured to selectively connect the driver circuit to a combination of the discharge circuit and the first load, and in at least one combination the discharge circuit is effectively coupled to the driver circuit when the first load is effectively decoupled from the driver circuit. In some implementations, the discharge control assembly module is included in a camera flash assembly having one or more light emitting diodes.

Some implementations include a device comprising a discharge circuit, a processor and a memory. In some implementations, the discharge circuit selectively connectable to a driver circuit, the discharge circuit configured to provide a dominant discharge path for a driver circuit when the driver circuit is effectively decoupled from a first load in order to decay an electrical condition of the driver circuit produced prior to the driver circuit being effectively decoupled from the first load. In some implementations, the memory includes instructions, that when executed by the processor cause the device to selectively connect the driver circuit to a combination of the discharge circuit and the first load, and in at least one combination the discharge circuit is effectively coupled to the driver circuit when the first load is effectively decoupled from the driver circuit. In some implementations, the instructions, when executed by the processor, cause the device to couple the discharge circuit to the driver circuit before the end of a first duration, and decouple the driver circuit from the first load at the end of the first duration.

Some implementations include a method of decaying an electrical condition of a driver circuit, the electrical condition produced prior to the driver circuit being effectively decoupled from a primary intended load. In some implementations, the method includes, coupling a discharge circuit to the driver circuit, the discharge circuit configured to provide a dominant discharge path for the driver circuit when the driver circuit is effectively decoupled from the primary intended load; and decoupling the driver circuit from the primary intended load.

In some implementations, the driver circuit is decoupled from the primary intended load after a first duration. Some implementations further comprise providing an electrical surge from the driver circuit to the primary intended load during the first duration. In some implementations, the driver circuit is coupled to the discharge circuit during the first duration. Some implementations further comprise decoupling the driver circuit from the discharge circuit at the end of a second duration, the second duration extending beyond the end of the first duration. In some implementations, the second duration starts when the driver circuit is effectively decoupled from the primary intended load. Some implementations further comprise decoupling the driver circuit from the discharge circuit after the driver circuit has been decoupled from the primary intended load.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 10A-10C are schematic diagrams of different integrated circuit implementations of the discharge controlled boost circuit operating configuration of FIG. 4.

FIG. 11 is a schematic diagram of an implementation of a module including the discharge controlled boost circuit operating configuration of FIG. 4.

Figure 1:
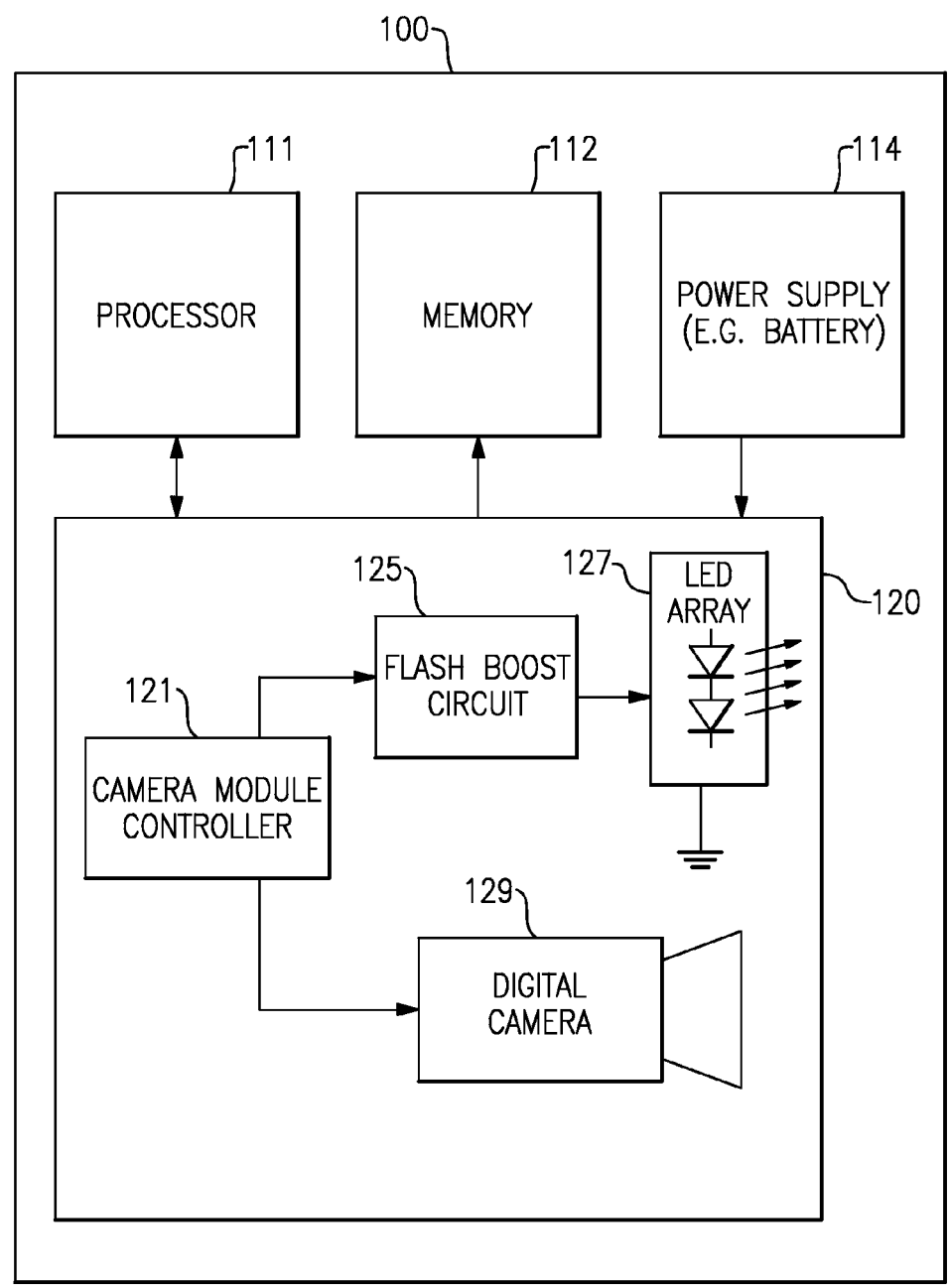
FIG. 1 is a schematic diagram of an electronic device including digital camera module according to some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the drawings.

DETAILED DESCRIPTION

Numerous details are described herein in order to provide a thorough understanding of the example implementations illustrated in the accompanying drawings. However, the invention may be practiced without many of the specific details. Well-known methods, components, and circuits have not been described in exhaustive detail so as not to unnecessarily obscure more pertinent aspects of the implementations described herein.

FIG. 1 is a schematic diagram of an electronic device 100 including a digital camera module 120. The electronic device 100 is one of a number of devices including, without limitation, a computer, a laptop computer, a tablet device, a netbook, an internet kiosk, a personal digital assistant, a mobile phone, a smartphone, a gaming device, a computer server, or any other computing device. In some implementations, the electronic device 100 includes one or more processors, one or more types of memory, a display and/or other user interface components such as a keyboard, a touch screen display, a mouse, a track-pad and/or any number of supplemental components, ports and communication elements to add functionality. While pertinent features are illustrated, those skilled in the art will appreciate from the present disclosure that various other features have not been illustrated for the sake of brevity and so as not to obscure more pertinent aspects of the example implementations disclosed herein. To that end, as a non-limiting example, the electronic device 100 includes the aforementioned digital camera module 120, as well as a processor 111, a memory 112, and a power supply 144.

In some implementations, the power supply 114 includes without limitation at least one of a battery, a battery charger, a voltage supply rail, an AC-to-DC converter and a connection to an external power source. In some implementations, the processor 111 is configured to execute instructions of one or more programs stored in the memory 112. Additionally, the processor 111 may be shared by one or more components within, and in some cases, beyond the function of the electronic device 100.

In some implementations, the memory 112 includes one or more memory devices constituting a non-transitory computer readable storage medium. For example, in some implementations the memory 112 includes a combination of random access memory (e.g., DRAM, SRAM, DDR RAM and/or other random access solid state memory devices) and non-volatile memory (e.g., magnetic disk storage devices, optical disk storage devices, flash memory, or other non-volatile solid state storage devices). In some implementations, the memory 112 may optionally include an interface that provides the device with access to one or more storage devices remotely located from the device 100. In some implementations, the memory 112 stores one or more programs, modules and data structures, or a subset thereof. The memory devices can be configured for enterprise storage suitable for applications such as cloud computing, or for caching data in secondary storage, such as hard disk drives. Additionally and/or alternatively, the memory can also be configured for relatively smaller-scale applications such as personal flash drives or hard-disk replacements for personal, laptop and tablet computers, as well as smartphones and the like.

As shown in FIG. 1, the digital camera module 120 includes a camera module controller 121, a digital camera 129, a light emitting diode (LED) array 127 configured as a camera flash, and a flash boost circuit 125. The camera module controller 121 is configured to coordinate the operation of the other components of the digital camera module 120 in response to control commands received from other components of the electronic device 100, such as the processor 111. To that end, the camera module controller 121 is coupled to receive commands from components external to the digital camera module 120, and is internally coupled to the components of the digital camera module 120.

One of the functions of the camera module controller 121 is to coordinate the occurrence of a flash of light with the operation of the digital camera 129. The flash of light is produced by the LED array 127 and the flash boost circuit 125. In operation, the flash boost circuit 125 provides a relatively high power electrical surge to the LED array 127, which causes the LEDs to emit a burst of light constituting a flash.

A drawback of incorporating additional components, such as a digital camera and flash, into existing devices is that new components add to the cumulative risk of a component failure that will leave the entire device unusable or significantly less desirable from an end user perspective. Continuing the example above, a smartphone as a whole may be less useful to the end user if the digital camera integrated into the smartphone stops working. Similarly, one or more of the sub-components associated with the digital camera may stop working as expected, which may also reduce the overall utility of the smartphone to the end user.

Component failure is particularly serious when a component failure damages an electronic device as a whole. Elaborating on the example above with reference to FIG. 1, in part because of the relatively high power levels at which the flash boost circuit 125 operates, the flash boost circuit 125 circuit can damage the electronic device 100 as a whole by sinking excessive current and/or causing a voltage spike. The excessive current and/or voltage spike can reach levels destructive to the digital camera module 120 and other components in the electronic device 100. Even if a single current sink and/or voltage spike does not cause a failure, the use of the flash boost circuit 125 may eventually lead to a failure as the components deteriorate as a result of being subjected to repeated relatively high power electrical surges and the undesired after effects.

Figure 2:
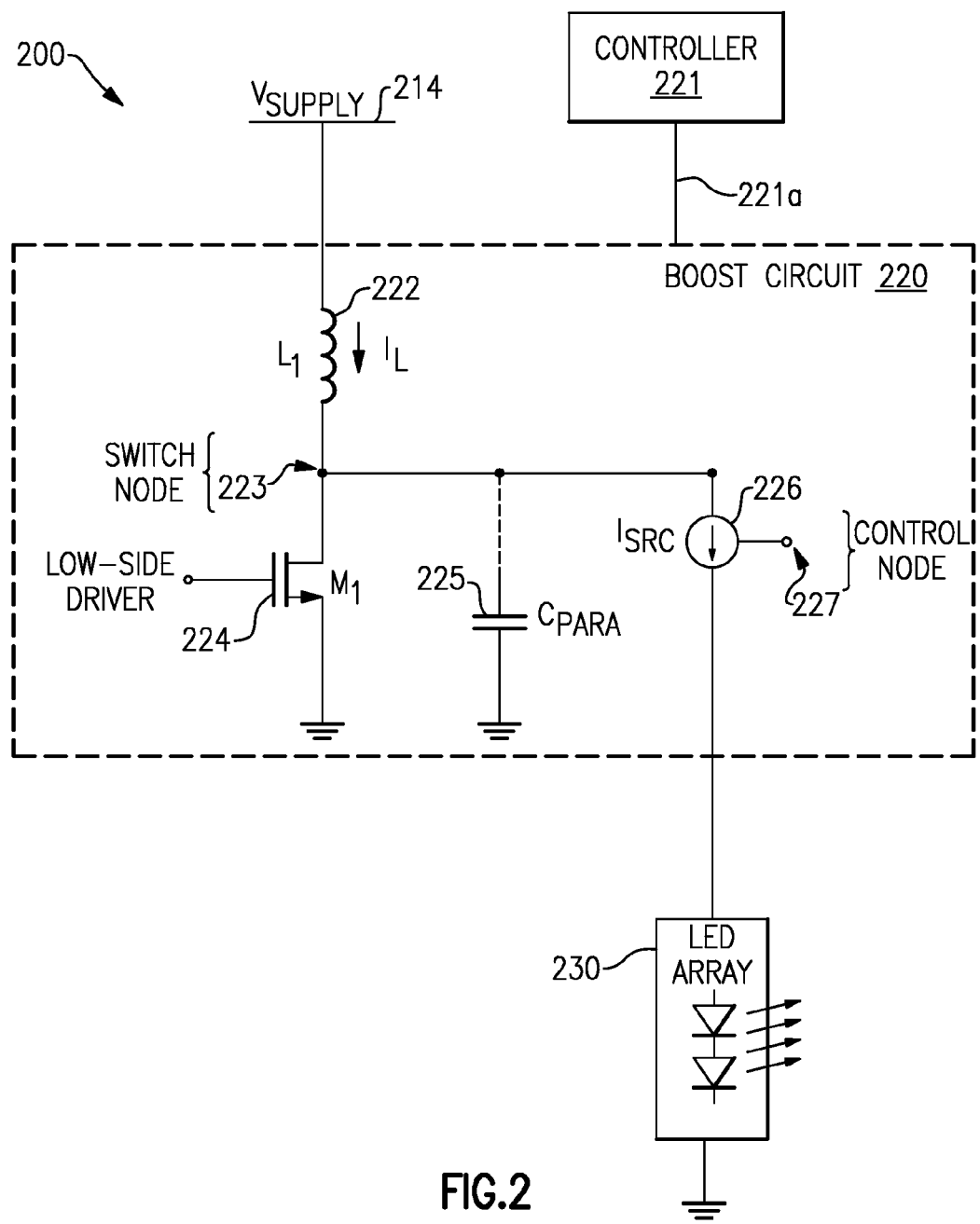
FIG. 2 is a schematic diagram of a boost circuit operating configuration for a flash-LED driver according to some implementations.

FIG. 2 is a schematic diagram of a flash boost circuit operating configuration 200 according to some implementations. While pertinent features are illustrated, those skilled in the art will appreciate from the present disclosure that various other features have not been illustrated for the sake of brevity and so as not to obscure more pertinent aspects of the example implementations disclosed herein. To that end, as a non-limiting example, the flash boost circuit operating configuration 200 includes a boost circuit 220, a controller 221, and a LED array 230. The controller 221 is coupled to the boost circuit 220 through control line 221a in order to provide a control signal to the boost circuit 220. The boost circuit 220 is coupled to the LED array 230 in order to provide the LED array 230 with an electrical surge for producing a flash of light. The boost circuit 220 draws a DC operating current from the voltage supply 214.

The boost circuit 220 includes a switch node 223, an inductor 222 ($L_1$), a NMOS transistor 224 ($M_1$) and a current source 226 ($I_{SRC}$). The inductor 222 is coupled between the voltage supply 214 and the switch node 223. The NMOS transistor 224 ($M_1$) is coupled between the switch node 223 and ground. More specifically, the drain of the NMOS transistor 224 ($M_1$) is coupled to the switch node 223, and the source is coupled to ground. The gate of the NMOS transistor 224 ($M_1$) is controlled by a low-side driver (not shown). The current source 226 ($I_{SRC}$) is coupled between the switch node 223 and the LED array 230. The current source 226 ($I_{SRC}$) includes a control node 227 that that is used to switch the current source 226 ($I_{SRC}$) between on and off states, such that the current source 226 ($I_{SRC}$) is effectively an open circuit in the off state.

Additionally, as also shown in FIG. 2, the boost circuit 220 includes a parasitic capacitive path 225 ($C_{PARA}$) between the switch node 223 and ground. Those skilled in the art will appreciate that a parasitic capacitive path typically includes an unintended and undesired capacitive structure formed between components that can establish a voltage potential difference between one another. As an approximation and abstraction, the parasitic capacitive path 225 ($C_{PARA}$) is formed between switch node 223 and ground by elements constituting both. For example, a capacitive structure includes a dielectric substrate separating a ground plane or ground wire and a signal transmission line or wire trace. Similarly, in another example, a capacitive structure is formed on an integrated circuit die between metal lines separated by one or more layers of dielectric or semiconductor material, or between metal lines and a ground plane separated from the metal lines by the bulk of the semiconductor. In various instances, the parasitic capacitance 225 typically ranges from 50 pF to 100 pF, however, values outside of this range also occur.

In operation, an electrical surge is provided by the boost circuit 220 to the LED array 226 in order to produce a flash of light. The duration of the flash of light is managed by abruptly decoupling the current source 226 ($I_{SRC}$), which occurs as a result of switching the current source 226 ($I_{SRC}$) to the off state. The abrupt decoupling causes a voltage spike on the switch node 223 because the field potential built up in the inductor 222 ($L_1$) cannot be instantaneously dissipated. The voltage spike is an unstable electrical condition that results in an undesirable current discharge through the parasitic capacitive path 225 ($C_{PARA}$).

Voltage spikes in the boost circuit 220 can reach destructive levels that can damage the boost circuit 220. More specifically, in some camera flash applications suitable for smartphones and the like, the current through the current source 226 ($I_{SRC}$) can reach levels between 500 mA to 2 A. When the flash event is over the resulting voltage spike at the switch node 223 can reach levels that exceed the voltage tolerances of transistors included in the boost circuit 220 (e.g. the NMOS transistor 224) and/or transistors proximate to the boost circuit 220.

Figure 3:
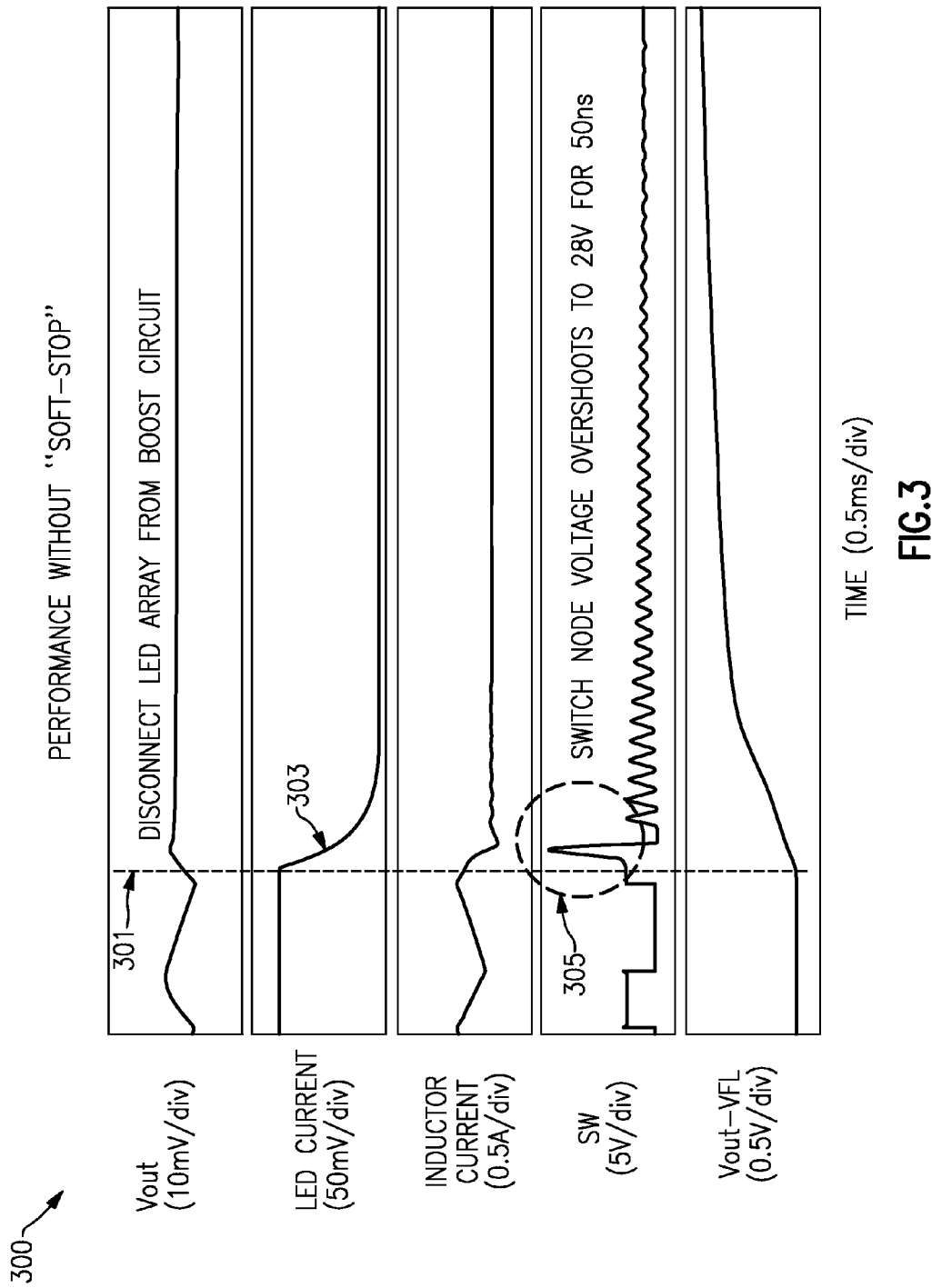
FIG. 3 is a performance diagram showing a voltage spike caused in a boost circuit not enabled with discharge control as provided by some implementations.

FIG. 3 is a performance diagram 300 showing a voltage spike caused by abruptly decoupling the boost circuit 220, which not enabled with discharge control as provided by some implementations. The vertical dashed line 301 is a time marker at which the current source 226 ($I_{SRC}$) is decoupled from the LED array 230 by switching to the off state. The LED current, indicated by 303, draws down after the decoupling event. A voltage spike indicated by 305 occurs on the switch node 223 because the residual field in the inductor 222 ($L_1$) charges the parasitic capacitance 225 ($C_{PARA}$). In this configuration, with a input voltage of 3 V, output voltage of 7.2 V and a 200 mA LED current, an average 0.5 A inductor current flows into the parasitic capacitance 225 ($C_{PARA}$) at the switch node 223 leading to an approximately 28 V voltage spike that lasts about 50 ns. In some cases a particular voltage spike can reach a level that is destructive to one or more components. However, even if a particular voltage spike or a series of voltage spikes do not individually reach a destructive level, repeated operation of the boost circuit subjects the various components to cycles of voltage spikes and current discharges that deteriorate the surrounding components, which may eventually lead to a failure of a component or the electronic device as a whole.

The various implementations described herein include systems, methods and/or circuit-based devices that provide discharge control for boost circuits and the like. Numerous details are described herein in order to provide a thorough understanding of the example implementations illustrated in the accompanying drawings. However, the invention may be practiced without many of the specific details. Well-known methods, components, and circuits have not been described in exhaustive detail so as not to unnecessarily obscure more pertinent aspects of the implementations described herein.

In one implementation includes a discharge control assembly including a discharge circuit and a controller. The discharge circuit is configured to provide a dominant discharge path for the driver circuit when the driver circuit is effectively decoupled from a first load. The dominant discharge path enables the decay of an electrical condition of the driver circuit produced prior to the driver circuit being effectively decoupled from the first load. The controller is configured to selectively connect the driver circuit to a combination of the discharge circuit and the first load. In at least one combination the discharge circuit is effectively coupled to the driver circuit when the first load is effectively decoupled from the driver circuit.

Figure 4:
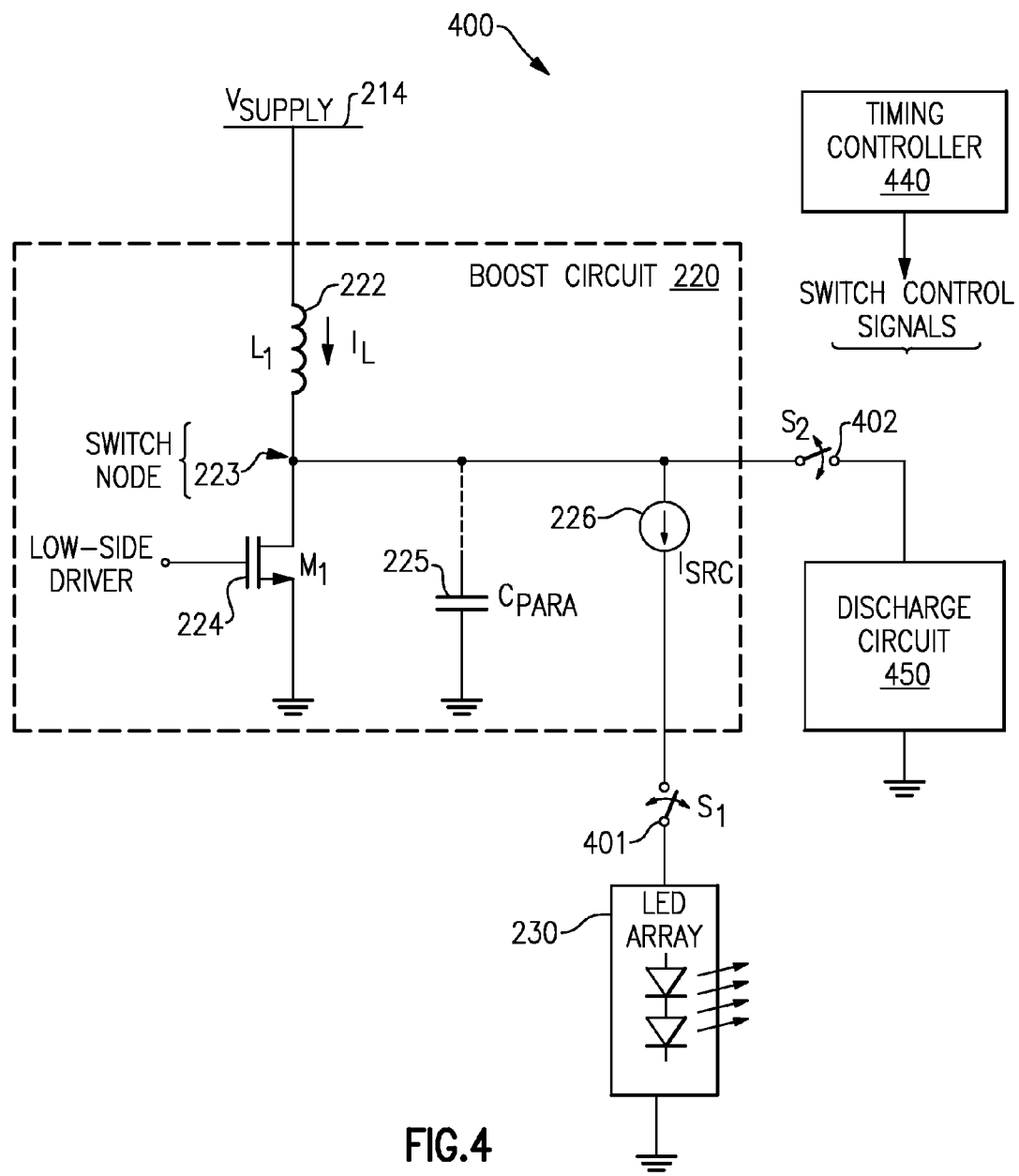
FIG. 4 is a schematic diagram of a boost circuit operating configuration, for a flash-LED driver, including discharge control according to some implementations.

As a more specific example, as provided by some implementations, a dominant discharge path is provided to drain the inductor current when a boost circuit is decoupled from the LED array. The discharge path reduces, if not eliminates, a voltage spike caused by decoupling the boost circuit from the LED array. To that end, FIG. 4 is a schematic diagram of a boost circuit operating configuration 400 including discharge control according to some implementations. The boost circuit operating configuration 400 illustrated in FIG. 4 is adapted from the boost circuit operating configuration 200 illustrated in FIG. 2. Elements common to each include common reference numbers, and only the differences between FIGS. 2 and 4 are described herein for the sake of brevity. Moreover, while certain specific features are illustrated, those skilled in the art will appreciate from the present disclosure that various other features have not been illustrated for the sake of brevity and so as not to obscure more pertinent aspects of the example implementations disclosed herein. Specifically, the boost circuit operating configuration 400 shown in FIG. 4 additionally includes a timing controller 440, a discharge circuit 450, a first coupling switch 401 ($S_1$) and a second coupling switch 402 ($S_2$). The first coupling switch 401 ($S_1$) is connected in series between the current source 226 ($I_{SRC}$) and the LED array 230. The second coupling switch 402 ($S_2$) is connected in series between the switch node 223 and the discharge circuit 450.

In operation, the timing controller 440 provides switch control signals to the first and second switches 401, 402 in order to selectively connect the boost circuit to a combination of the discharge circuit 450 and the LED array 450. In one mode of operation, a flash event of a first duration concludes by decoupling the LED array 230 from the boost circuit 220 while the discharge circuit 450 is coupled to the boost circuit. In some implementations, this is accomplished by the timing controller 440 sending a control signal to close the second coupling switch 402 ($S_2$) to connect the discharge circuit 450 to the boost circuit 220 before the end of the first duration characterizing the flash event. The timing controller 440 also sends a control signal to open the first coupling switch 401 ($S_1$) at the end of the first duration in order to decouple the LED array 230 from the boost circuit 220, which ends the flash event. Additionally and/or alternatively, in some implementations the timing controller 440 decouples the discharge circuit 450 by sending a control signal to open the second coupling switch 402 ($S_2$) at the end of a second duration. In some implementations, the second duration is provided to allow enough time for the electrical condition of the boost circuit (i.e., the residual field in the inductor) to controllably decay and reduce the likelihood that a voltage spike is generated. In some implementations, the discharge circuit 450 is decoupled at the end of the second duration in order to reduce unnecessary current draw when the boost circuit 220 is not being used for its intended purpose.

Figure 5:
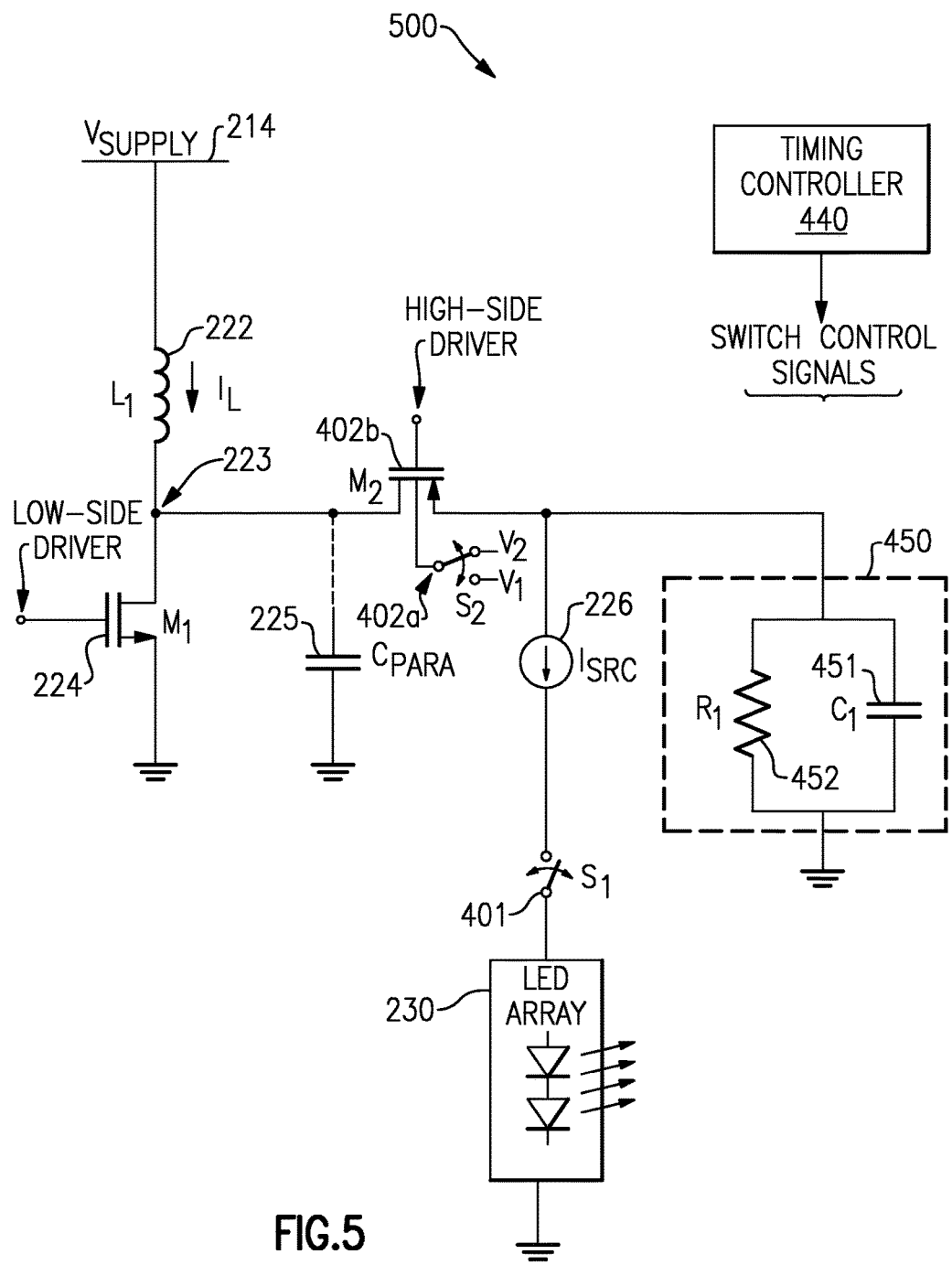
FIG. 5 is a schematic diagram of a boost circuit operating configuration, for a flash-LED driver, including discharge control according to some implementations.

FIG. 5 is a schematic diagram of a boost circuit operating configuration 500 including discharge control according to some implementations. The boost circuit operating configuration 500 illustrated in FIG. 5 is similar to and adapted from the boost circuit operating configuration 400 illustrated in FIG. 4. Elements common to each include common reference numbers, and only the differences between FIGS. 4 and 5 are described herein for the sake of brevity. Moreover, while certain specific features are illustrated, those skilled in the art will appreciate from the present disclosure that various other features have not been illustrated for the sake of brevity and so as not to obscure more pertinent aspects of the example implementations disclosed herein.

To that end, as one example implementation, the discharge circuit 450 includes a resistor 452 ($R_1$) and a capacitor 451 ($C_1$) connected in parallel between the switch node 223 and ground. Those skilled in the art will appreciate from the present disclosure that either the resistor or capacitor or both can be replaced by a combination of circuit elements, and the configuration shown in FIG. 5 is merely one example implementation of a suitable discharge circuit. The purpose of the discharge circuit 450 is provide a dominant discharge path that reduces the influence of the parasitic capacitance 225 ($C_{PARA}$), and reduce the likelihood that a voltage spike is created at the end of the flash event.

Additionally, the second coupling switch 402a ($S_2$) is incorporated into a "body-snatcher" configuration with a PMOS transistor 402b ($M_2$). The PMOS transistor 402b ($M_2$) is coupled between the switch node 223 and the parallel combination of the current source 226 ($I_{SRC}$) and the discharge circuit 450. The body of the high-side of the PMOS transistor 402b ($M_2$) is selectively connected to one of the input supply voltage (YIN) and the output voltage ($V_{out}$) by the second coupling switch 402a ($S_2$). This so called "body-snatcher" configuration enables a truer disconnect between the LED array 230 and the input supply voltage. During the flash operation when the boost circuit 220 is on, the body of the high-side PMOS transistor 402b ($M_2$) is connected to the boost output (Vout). When the flash event is over, the coupling switch $S_1$ is opened and then the PMOS transistor 402b ($M_2$) is shut-off (creating an open circuit) in delayed succession. The delay allows the field in the inductor 222 ($L_1$) to decay by discharging a current through the discharge circuit 450. In other words, the PMOS transistor 402b ($M_2$), utilized as a switch, remains on (i.e., conductive) long enough for the instantaneous current in the inductor 222 ($L_1$) to drain through the discharge circuit 450. By contrast, abruptly decoupling the LED array 230 from the boost circuit 220, without the discharge circuit 450, charges the parasitic capacitance 225, which causes an undesirable voltage spike. More specifically, when the switch $S_1$ is opened, the instantaneous current in the inductor 222 ($L_1$) would flow to the parasitic capacitance 225 (CPARA) if the discharge circuit 450 is not coupled to the boost circuit through operation of the second switch $S_2$. In some implementations, this "soft-stop" method reduces the stress on the NMOS transistor 224 ($M_1$), and other surrounding components.

Figure 6:
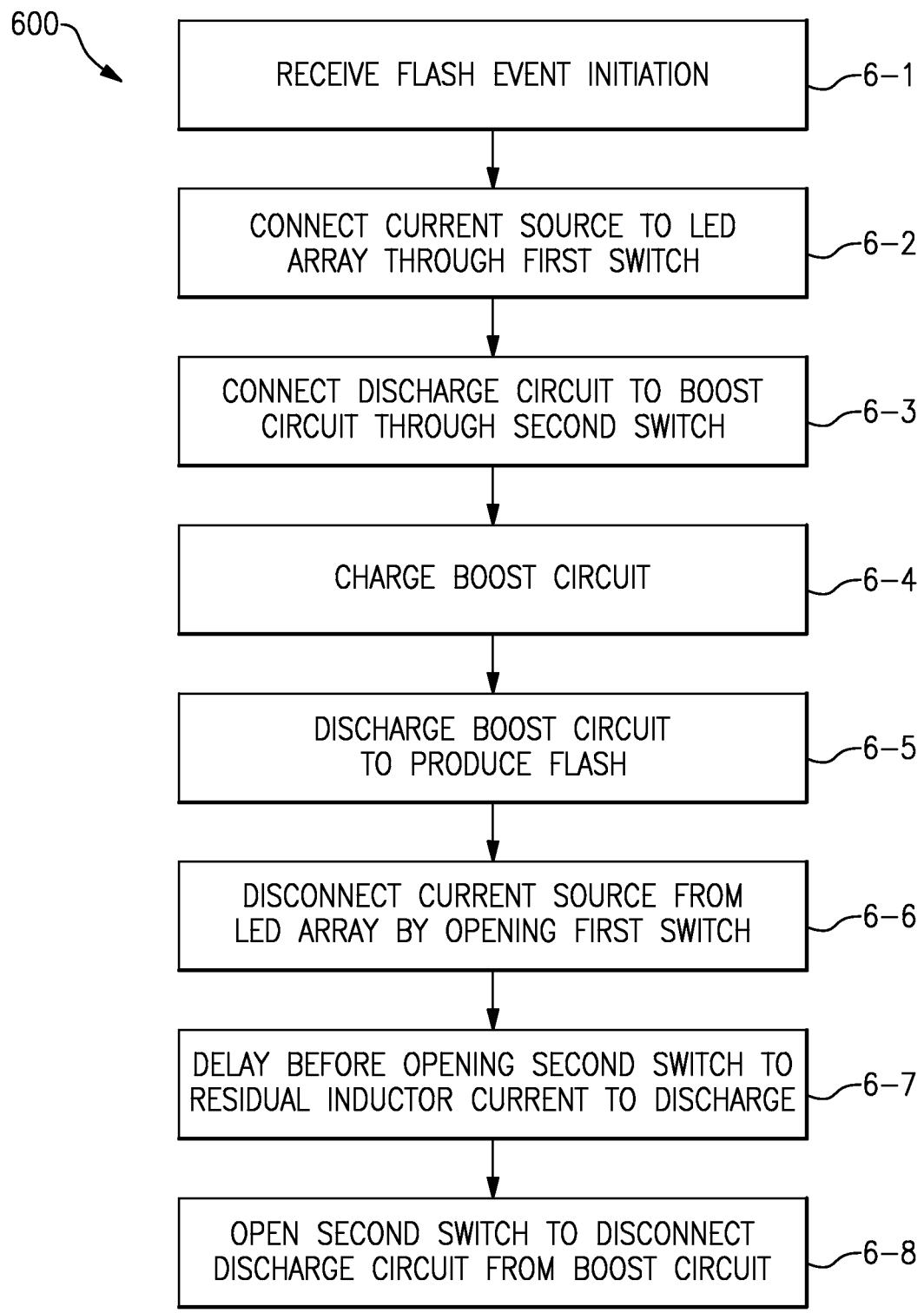
FIG. 6 is a flowchart of an implementation of a method of controlling the discharge of a boost circuit operating configuration according to some implementations.

FIG. 6 is a flowchart of an implementation of a method 600 of controlling a discharge of a boost circuit operating configuration according to some implementations. In some implementations, the method 600 is performed by a timing controller (e.g. timing controller 440 of FIG. 5). In some implementations, the method 600 is performed by a processor executing one or more computer readable instructions stored in one or more memory devices constituting a non-transitory computer readable storage medium. Briefly, the method 600 includes selectively coupling and decoupling a driver circuit to a combination of a discharge circuit and an intended primary load, so as to controllably decay an electrical condition of the driver circuit present when the primary intended load is decoupled.

To that end, as represented by block 6-1, method 600 includes receiving a flash event initiation command. For example, with reference to FIGS. 1 and 4, the timing controller 440 receives a flash event initiation from one of the processor 111 and the camera module controller 121. As represented by block 6-2, the method 600 includes connecting the primary intended load to the driver circuit through a first switch. For example, with reference to FIG. 4, the LED array 230 is connected to the boost circuit 220 by closing the first coupling switch 401 ($S_1$). As represented by block 6-3, the method 600 includes connecting the discharge circuit to the driver circuit through a second switch. For example, with reference to FIG. 4, the discharge circuit 450 is connected to the boost circuit 220 by closing the second coupling switch 402 ($S_2$). Those skilled in the art will appreciate from the present disclosure that the portions of the method 600 described with reference to blocks 6-2 and 6-3 may be reversed in some implementations.

As represented by block 6-4, the method 600 includes charging the driver circuit (e.g. boost circuit 220). As represented by block 6-5, the method 600 includes discharging the driver circuit through the primary intended for a first duration to produce a flash. As represented by block 6-6, the method 600 includes decoupling the primary intended load from the driver circuit by opening the first switch. For example, with reference to FIG. 4, the LED array 230 is decoupled from the boost circuit 220 by opening the first coupling switch 401 ($S_1$). As represented by block 6-7, the method 600 includes imposing a delay before opening the second switch. As represented by block 6-8, the method 600 includes opening the second switch to disconnect the discharge circuit from the driver circuit. For example, with reference to FIG. 4, the discharge circuit 450 is decoupled from the boost circuit 220 by opening the second coupling switch 402 ($M_2$).

Figure 7:
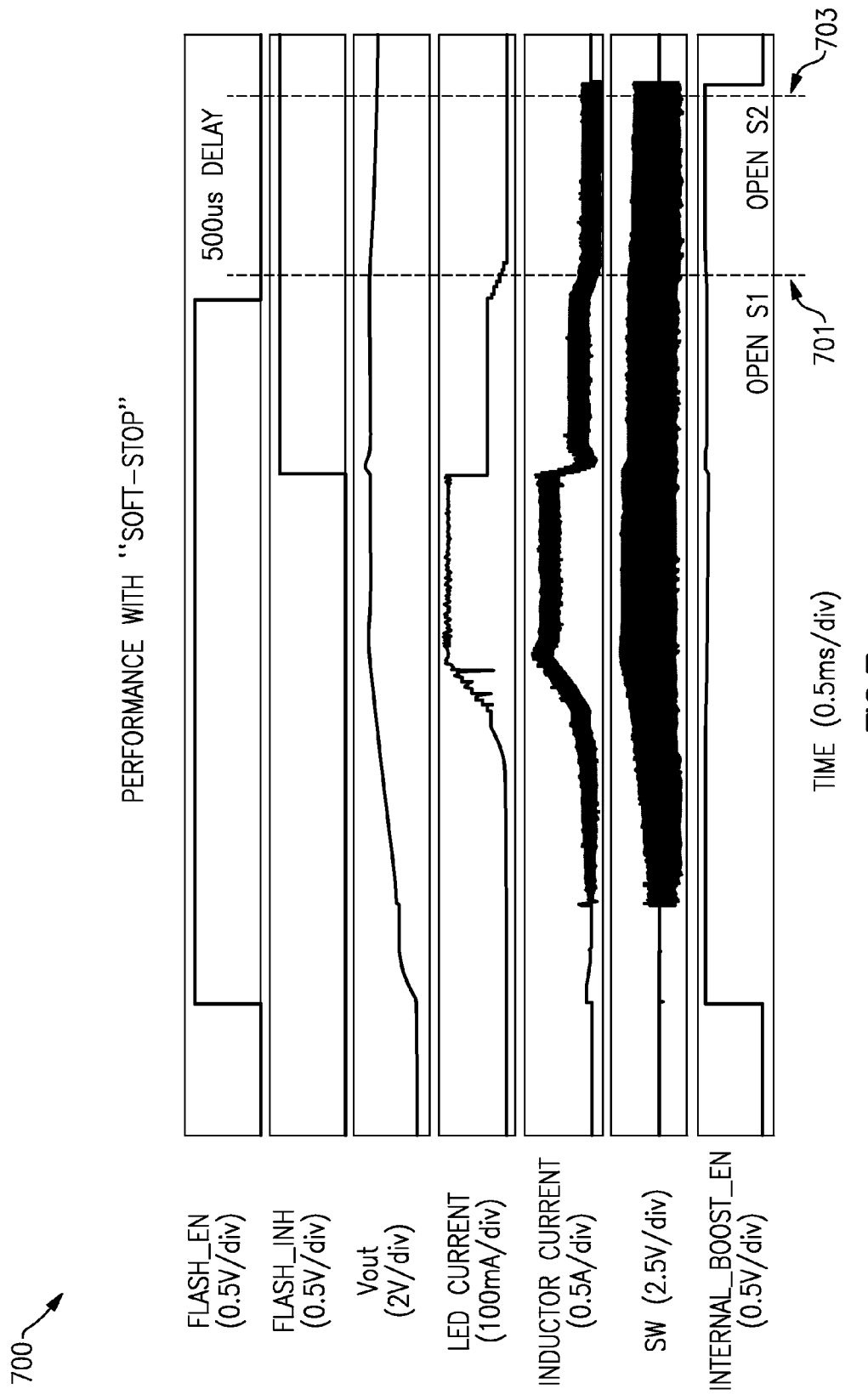
FIG. 7 is a performance diagram showing the controlled discharge of a boost circuit operating configuration including discharge control according to some implementations.
Figure 8:
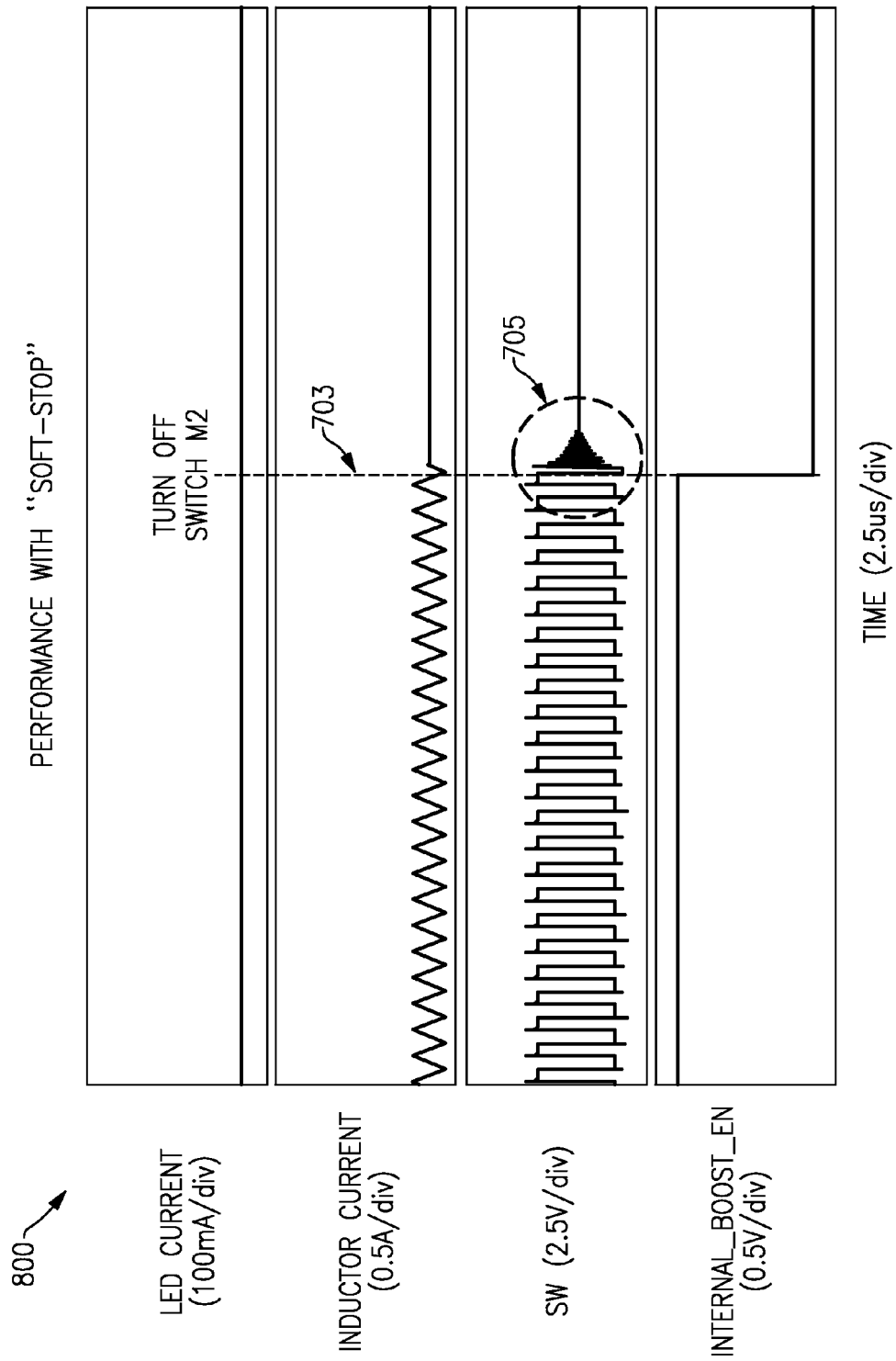
FIG. 8 is a performance diagram showing the controlled discharge of a boost circuit operating configuration including discharge control according to some implementations.

FIGS. 7 and 8 are performance diagrams 700 and 800 showing controlled discharge of the boost circuit operating configuration 500 of FIG. 5, which include discharge control according to some implementations. Specifically, with reference to FIG. 7, the dashed lines 701 and 703 are respective time markers for when switches $S_1$ and $S_2$ are respectively opened. A substantial voltage spike is not created at the switch node 223 when the first coupling switch 401 ($S_1$) is opened, as indicated by time marker 701, because the second coupling switch 402 ($M_2$) is closed, which provides a dominant discharge path to the discharge circuit 450. When the second coupling switch 402 ($M_2$) is opened 500 ns later, as indicated by time marker 703, the inductor current has been dissipated. With additional reference to FIG. 8, the voltage at the switch node 223 is then able to decay gradually without spiking as highlighted by reference indicia 705.

Figure 9:
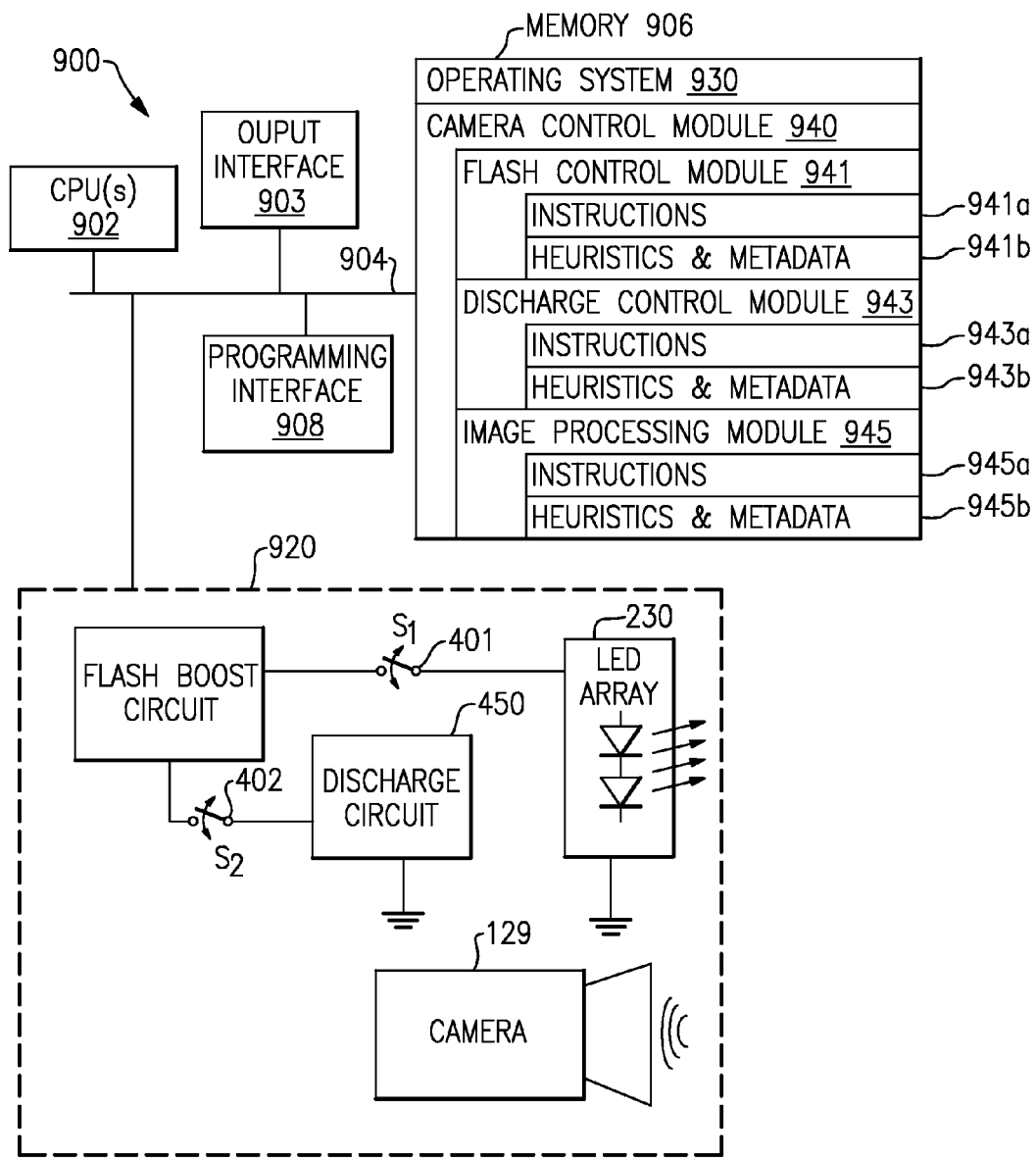
FIG. 9 is a block diagram of a boost circuit discharge control system in accordance with some implementations.

FIG. 9 is a block diagram of a boost circuit discharge control system 900 in accordance with some implementations. The boost circuit discharge control system 900 illustrated in FIG. 9 is similar to and adapted from the features described in FIGS. 1, 4 and 5. Elements common to both implementations include common reference numbers, and only the differences between FIG. 9 and FIGS. 1, 4 and 5 are described herein for the sake of brevity. Moreover, while certain specific features are illustrated, those skilled in the art will appreciate from the present disclosure that various other features have not been illustrated for the sake of brevity, and so as not to obscure more pertinent aspects of the implementations disclosed herein.

To that end, as a non-limiting example, in some implementations the boost circuit discharge control system 900 includes one or more processing units (CPU's) 902, a digital camera module 920, one or more output interfaces 903, a memory 906, a programming interface 908, one or more communication buses 904 for interconnecting these and various other components.

The digital camera module 920 includes the flash boost circuit 220, the first and second coupling switches 401 and 402, the discharge circuit 450 and the LED array 230, which are arranged as described above with reference to FIG. 4. The digital camera module 920 also includes the digital camera 129 described above with reference to FIG. 1.

The communication buses 904 may include circuitry (sometimes called a chipset) that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 may optionally include one or more storage devices remotely located from the CPU(s) 902. The memory 906, including the non-volatile and volatile memory device(s) within the memory 906, comprises a non-transitory computer readable storage medium. In some implementations, the memory 906 or the non-transitory computer readable storage medium of the memory 206 stores the following programs, modules and data structures, or a subset thereof including an optional operating system 930, and a camera control module 940.

The operating system 930 includes procedures for handling various basic system services and for performing hardware dependent tasks.

In some implementations, the camera control module 940 includes a flash control module 941, a discharge control module 943 and image control module 945. In some implementations, the flash control module 941 is configured to control the characteristics of the produced flash of light relative to the operation of the digital camera 129. To that end, in some implementations, the flash control module 941 includes a set of instructions 941a and heuristics and metadata 941b. In some implementations, the discharge control module 943 is configured to manage the operation of the boost circuit 220 and discharge circuit 450 as described above with reference to FIG. 4-8. For example, in some implementations, discharge control module 943 includes the functions of the timing controller 440. To that end, in some implementations, the discharge control module 943 includes a set of instructions 943a and heuristics and metadata 943b. In some implementations, the image processing module 945 is configured to manage the operation of the digital camera 129, as well as to provide options for changing the output images produced by the digital camera 129. To that end, in some implementations, the image processing module 945 includes a set of instructions 945*a* and heuristics and metadata 945*b*.

Moreover, FIG. 9 is intended as functional description of the various features which may be present in a particular implementation as opposed to a structural schematic of the implementations described herein. In practice, and as recognized by those of ordinary skill in the art, items shown separately could be combined and some items could be separated. For example, some functional blocks shown separately in FIG. 9 can be implemented in a single module and the various functions of single functional blocks can be implemented by one or more functional blocks in various implementations. The actual number of modules and the division of particular functions used to implement the boost circuit discharge control system 900 and how such features are allocated among them will vary from one implementation to another, and may depend in part on the particular combination of hardware, software and/or firmware chosen for a particular implementation.

FIGS. 10A-10C are schematic diagrams of different integrated circuit implementations of the discharge control operating configurations of FIGS. 4 and 5. While some example features are illustrated, those skilled in the art will appreciate from the present disclosure that various other features have not been illustrated for the sake of brevity and so as not to obscure more pertinent aspects of the example implementations disclosed herein. To that end, for example, FIG. 10A shows that in some implementations, some or all portions of each of the boost circuit 220 and the discharge circuit 450 (including switches $S_1$, $S_2$) can be part of a semiconductor die 1000. By way of an example, the boost circuit 220 and the discharge circuit 450 can be formed on a substrate 1002 of the die 1000. A plurality of connection pads 1004 can also be formed on the substrate 1002 to facilitate functionalities associated with some or all portions of each of the boost circuit 220 and the discharge circuit 450.

FIG. 10B shows that in some implementations, a semiconductor die 1000 having a substrate 1002 can include some or all portions of each of the boost circuit 220, discharge circuit 450 and timing controller 440 of FIG. 4. A plurality of connection pads 1004 can also be formed on the substrate 1002 to facilitate functionalities associated with some or all portions of each of the boost circuit 220, discharge circuit 450 and timing controller 440 of FIG. 4.

FIG. 10C shows that in some embodiments, a semiconductor die 1000 having a substrate 1002 can include some or all portions of each of the boost circuit 220, discharge circuit 450, timing controller 440 and LED array 230 of FIG. 4. A plurality of connection pads 1004 can also be formed on the substrate 1002 to facilitate functionalities associated with some or all portions of each of the boost circuit 220, discharge circuit 450, timing controller 440 and LED array 230 of FIG. 4.

In some implementations, one or more features described herein can be included in a module. FIG. 11 is a schematic diagram of an implementation of a module 1100 including the discharge control operating configurations of FIGS. 4 and 5. While some example features are illustrated, those skilled in the art will appreciate from the present disclosure that various other features have not been illustrated for the sake of brevity and so as not to obscure more pertinent aspects of the example implementations disclosed herein. The module 1100 includes a packaging substrate 1152, connection pads 1156, a CMOS (complementary metal oxide semiconductor) die 1000, the discharge circuit 450, and the LED array 230.

The CMOS die 1000 includes a substrate 1002 including some or all portions of the boost circuit 220 and some or all portions of the timing controller 440 of FIG. 4. A plurality of connection pads 1004 is formed on the substrate 1002 to facilitate functionalities associated with some or all portions of the boost circuit 220 and some or all portions of the timing controller 440 of FIG. 4.

The connection pads 1156 on the packaging substrate 1152 facilitate electrical connections to and from each of the CMOS die 1000, the discharge circuit and the LED array 230. For example, the connection pads 1156 facilitate the use of wirebonds 1154 for passing various signals and supply currents and/or voltages to each of the CMOS die 1000, the discharge circuit 450 and the LED array 230.

In some implementations, the components mounted on the packaging substrate 1152 or formed on or in the packaging substrate 1152 can further include, for example, one or more surface mount devices (SMDs) (e.g., 1161 included in the discharge circuit 450). In some embodiments, the packaging substrate 1152 can include a laminate substrate.

In some implementations, the module 1100 can also include one or more packaging structures to, for example, provide protection and facilitate easier handling of the module 1100. Such a packaging structure can include an overmold formed over the packaging substrate 1152 and dimensioned to substantially encapsulate the various circuits and components thereon.

It will be understood that although the module 1150 is described in the context of wirebond-based electrical connections, one or more features of the present disclosure can also be implemented in other packaging configurations, including flip-chip configurations.

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, a wireless router, a wireless access point, a wireless base station, etc. That is, those skilled in the art will also appreciate from the present disclosure that in various implementations the power amplifier open loop current clamp may be included in various devices, such as a computer, a laptop computer, a tablet device, a netbook, an internet kiosk, a personal digital assistant, an optical modem, a base station, a repeater, a wireless router, a mobile phone, a smartphone, a gaming device, a computer server, or any other computing device. In various implementations, such devices include one or more processors, one or more types of memory, a display and/or other user interface components such as a keyboard, a touch screen display, a mouse, a track-pad, a digital camera and/or any number of supplemental devices to add functionality.

Figure 12:
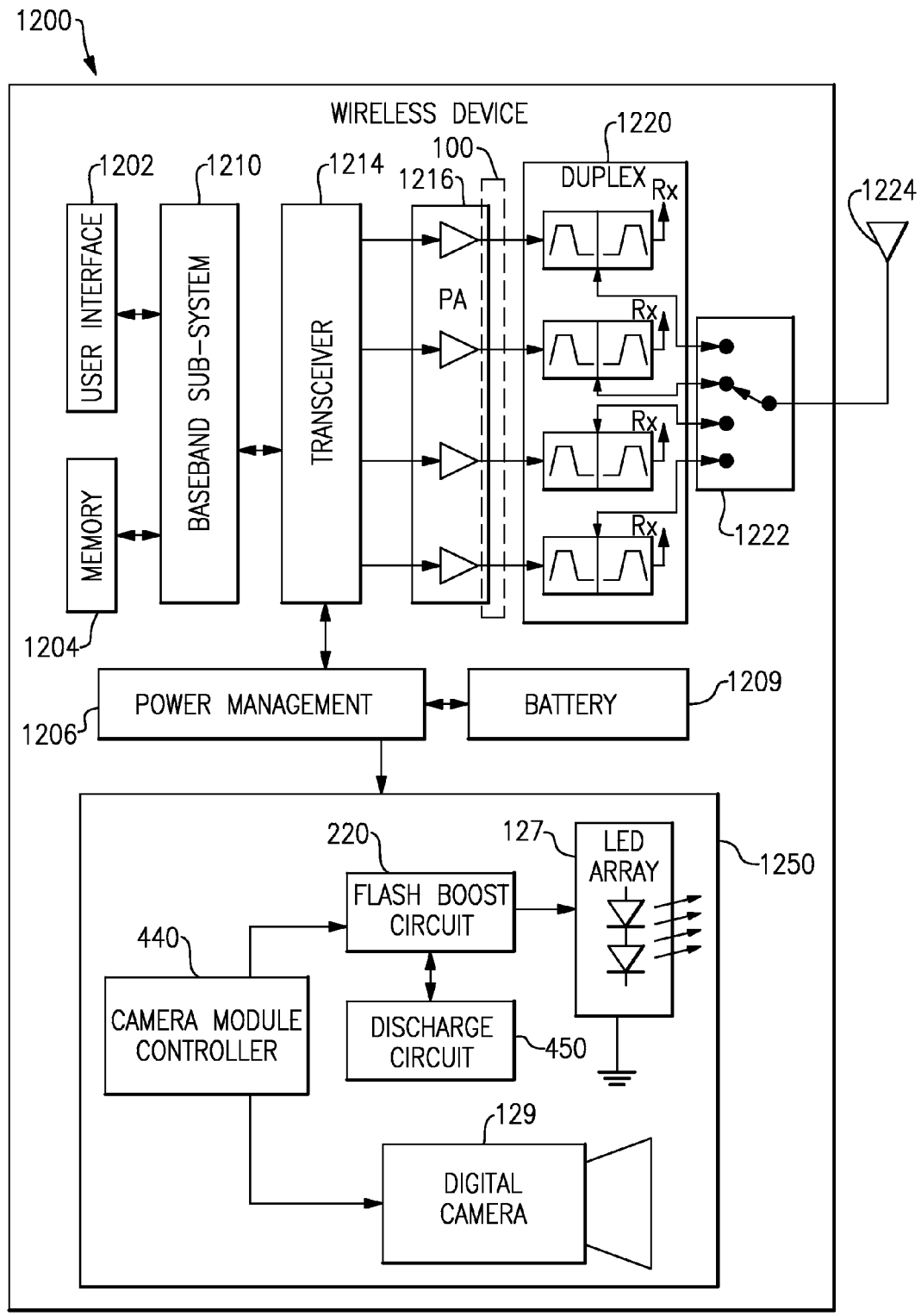
FIG. 12 is a schematic diagram of an implementation of a wireless device including one or more features described herein.

FIG. 12 is a schematic diagram of an implementation of a wireless device including one or more features described herein, such as the boost circuit operating configurations of FIGS. 4 and 5. While some example features are illustrated, those skilled in the art will appreciate from the present disclosure that various other features have not been illustrated for the sake of brevity and so as not to obscure more pertinent aspects of the example implementations disclosed herein.

One or more PAs 1216 as described herein are biased by respective bias circuit(s) (not shown) and compensated by respective compensation circuit(s) (not shown). In some implementations the PAs 1216 are packaged into a module including matching circuits 100. The PAs 1216 can receive respective RF signals from a transceiver 1214, that can be configured and operated in known manners to generate RF signals to be amplified and transmitted, and to process received signals. The transceiver 1214 is shown to interact with a baseband sub-system 1210 that is configured to provide conversion between data and/or voice signals suitable for a user and RF signals suitable for the transceiver 1214. The transceiver 1214 is also shown to be connected to a power management component 1206 that is configured to manage power for the operation of the wireless device 1200. Such power management can also control operations of the baseband sub-system 1210, access to the battery 1209, and a boost circuit operating configuration provided in the digital camera module 1250 discussed in more detail below.

The baseband sub-system 1210 is shown to be connected to a user interface 1202 to facilitate various input and output of voice and/or data provided to and received from the user. The baseband sub-system 1210 can also be connected to a memory 1204 that is configured to store data and/or instructions to facilitate the operation of the wireless device, and/or to provide storage of information for the user.

In the example wireless device 1200, outputs of the PAs 1216 are shown to be matched and routed to an antenna 1224 via respective duplexers 1220 and a band-selection switch 1222. The band-selection switch 1222 can include, for example, a single-pole-multiple-throw (e.g., SP4T) switch to allow selection of an operating band (e.g., Band 2). In some embodiments, each duplexer 1220 can allow transmit and receive operations to be performed simultaneously using a common antenna (e.g., 1224). In FIG. 12, received signals are shown to be routed to "Rx" paths (not shown) that can include, for example, a low-noise amplifier (LNA).

Additionally, in some implementations, the example wireless device 1200 includes the aforementioned digital camera module 1250. As shown in FIG. 12, the digital camera module 1250 includes the camera module controller 440, the digital camera 129, the light emitting diode (LED) array 127 configured as a camera flash, the flash boost circuit 220, and the discharge circuit 450. The camera module controller 440 is configured to coordinate the operation of the other components of the digital camera module 1250 in response to control commands received from other components of the electronic device 1200, such as the power management module 1206. To that end, the camera module controller 440 is coupled to receive commands from components external to the digital camera module 1250, and is internally coupled to the components of the digital camera module 1250.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A discharge control assembly comprising:
   a discharge circuit selectively connectable to a driver circuit, the discharge circuit configured to provide a dominant discharge path for the driver circuit when the driver circuit is effectively decoupled from a first load in order to decay an electrical condition of the driver circuit produced prior to the driver circuit being effectively decoupled from the first load; and
   a controller configured to selectively connect the driver circuit to a combination of the discharge circuit and the first load, and in at least one combination the discharge circuit is effectively coupled to the driver circuit when the first load is effectively decoupled from the driver circuit, the controller further configured to effectively decouple the driver circuit from the discharge circuit after the driver circuit has been decoupled from the first load.

2. The discharge control assembly of claim 1 further comprising the driver circuit.

3. The discharge control assembly of claim 1 wherein the driver circuit is configured to provide an electrical surge to the first load for a first duration.

4. The discharge control assembly of claim 3 wherein the controller is configured to effectively decouple the driver circuit from the first load at the end of the first duration.

5. The discharge control assembly of claim 3 wherein the controller is configured to effectively decouple the driver circuit from the discharge circuit at the end of a second duration, the second duration extending beyond the end of the first duration.

6. The discharge control assembly of claim 5 wherein the second duration starts when the driver circuit is effectively decoupled from the first load.

7. The discharge control assembly of claim 1 wherein the driver circuit includes an inductive element.

8. The discharge control assembly of claim 1 further comprising the first load.

9. The discharge control assembly of claim 1 wherein the first load includes one or more light emitting diodes.

10. The discharge control assembly of claim 1 wherein the first load includes a camera flash assembly.

11. A discharge control assembly module comprising:
a packaging substrate configured to receive a plurality of components;
a discharge circuit included on at least a portion of the packaging substrate, the discharge circuit selectively connectable to a driver circuit, the discharge circuit configured to provide a dominant discharge path for a driver circuit when the driver circuit is effectively decoupled from a primary intended load in order to decay an electrical condition of the driver circuit produced prior to the driver circuit being effectively decoupled from the primary intended load; and
a controller configured to selectively connect the driver circuit to a combination of the discharge circuit and the primary intended load, and in at least one combination the discharge circuit is effectively coupled to the driver circuit when the primary intended load is effectively decoupled from the driver circuit, the controller further configured to effectively decouple the driver circuit from the discharge circuit after the driver circuit has been decoupled from the first load.

12. The discharge control assembly module of claim 11 further comprising the driver circuit.

13. The discharge control assembly module of claim 11 wherein the driver circuit is configured to provide an electrical surge to the first load for a first duration.

14. The discharge control assembly module of claim 13 wherein the controller is configured to effectively decouple the driver circuit from the first load at the end of the first duration.

15. A method of decaying an electrical condition of a driver circuit, the electrical condition produced prior to the driver circuit being effectively decoupled from a primary intended load, the method comprising:
coupling a discharge circuit to the driver circuit, the discharge circuit configured to provide a dominant discharge path for the driver circuit when the driver circuit is effectively decoupled from the primary intended load;
decoupling the driver circuit from the primary intended load; and
decoupling the driver circuit from the discharge circuit after the driver circuit has been decoupled from the primary intended load.

16. The method of claim 15 wherein the driver circuit is decoupled from the primary intended load after a first duration.

17. The method of claim 16 further comprising providing an electrical surge from the driver circuit to the primary intended load during the first duration.

18. The method of claim 16 wherein the driver circuit is coupled to the discharge circuit during the first duration.

19. The method of claim 16 further comprising decoupling the driver circuit from the discharge circuit at the end of a second duration, the second duration extending beyond the end of the first duration.

20. The method of claim 19 wherein the second duration starts when the driver circuit is effectively decoupled from the primary intended load.

* * * * *